United States Patent
Tsuchiya et al.

[11] Patent Number: 6,025,866
[45] Date of Patent: Feb. 15, 2000

[54] SUPERRESOLUTION OPTICAL PICKUP APPARATUS

[75] Inventors: Yoichi Tsuchiya; Yasuyuki Kanou, both of Hashima; Seiji Kajiyama, Ibi-gun; Koichi Tada, Motosu-gun; Katsutoshi Hibino, Gifu; Shigeki Hori, Ogaki, all of Japan

[73] Assignee: Sanyo Electric Co., Ltd., Moriguchi, Japan

[21] Appl. No.: 09/064,032

[22] Filed: Apr. 22, 1998

[30] Foreign Application Priority Data

Apr. 24, 1997 [JP] Japan ................................. 9-107894

[51] Int. Cl.[7] ........................................................ B41J 2/47
[52] U.S. Cl. ........................................................ 347/256
[58] Field of Search .................................... 347/255, 256; 349/1; 369/13, 110, 118

[56] References Cited

U.S. PATENT DOCUMENTS

| | | | |
|---|---|---|---|
| 5,150,234 | 9/1992 | Takahashi et al. | 349/1 |
| 5,796,683 | 8/1998 | Sumi et al. | 369/13 |

FOREIGN PATENT DOCUMENTS 5-120720   5/1993   Japan .

OTHER PUBLICATIONS

MAG 96–200, IEEE Japan, Nov. 29, 1996, pp. 1–8—(partial translation).

Primary Examiner—N. Le
Assistant Examiner—Shih-Wen Hsieh
Attorney, Agent, or Firm—Armstrong, Westerman, Hattori, McLeland & Naughton

[57] ABSTRACT

An optical pickup apparatus including a polarization plane rotary unit arranged between a semiconductor laser and an objective lens, and a polarizing film arranged between the polarization plane rotary unit and the objective lens. The polarization plane rotary unit includes liquid crystal, two glass plates sandwiching the liquid crystal, and transparent electrodes patterned to a predetermined configuration on an inner face of these glass planes. The polarization plane rotary unit permits passage of the laser beam without rotating the plane of polarization of the entire laser beam at the time of recording, and permits passage of the laser beam with the plane of polarization of the center portion of the laser beam rotated and the plane of polarization of the remaining outer portion of the laser beam not rotated at the time of reproduction. Only the outer portion of the laser beam is focused on a magneto-optical disk in a reproduction mode, so that a main beam of a small spot is formed by mutual interference. Since the plane of polarization of the laser beam directed on the magneto-optical disk is not rotated, the Kerr angle of rotation can be detected at high accuracy. As a result, the reproducibility is improved.

10 Claims, 9 Drawing Sheets

3

SUPERRESOLUTION OPTICAL PICKUP APPARATUS

BACKGROUND OF THE INVENTION

1. Field of the Invention

The present invention relates to superresolution optical pickup apparatuses, and more particularly, to a superresolution optical pickup apparatus that records a signal at high density on a magneto-optical recording medium, and reproducing a signal from the magneto-optical recording medium.

2. Description of the Background Art

A magneto-optical recording medium is known as a recording medium that allows recording and/or reproduction of a signal at high density. In such a medium, the track includes a land portion and a groove portion. Both the land and the groove allow recording or reproduction.

Recording of a domain having a shortest domain length as small as approximately 0.15 μm is now achieved with the recording capacity as large as 7 Gigabytes. In accordance with such an increase in the recording density, the spot diameter of the laser beam must be reduced in order to reproduce a recorded signal. In order to reduce the spot diameter of a laser beam directed to the signal recording face, an optical superresolution method is employed which generates a main beam and side beams by blocking the center area of the laser beam, and directing the beam onto a magneto-optical recording medium.

In Hori et al., "CAD-MSR Disk Reading with Superresolution Optical Head", Papers of Technical Meeting on Magnetics, MAG-96-200, IEEE Japan, Nov. 29, 1996, pp. 1–8, a superresolution optical head is disclosed including a liquid crystal shutter for generating a main beam and side beams by blocking the center portion of a laser beam. However, this document is absolutely silent about the specific structure of the liquid crystal shutter, the direction of polarization of the laser beam, and the like.

In general, liquid crystal rotates the plane of polarization of a laser beam passing therethrough. Therefore, the usage of liquid crystal for the shutter in an optical pickup apparatus for a magneto-optical recording medium poses the following problems. In order to reproduce a signal from a magneto-optical recording medium, the Kerr angle of rotation between the incident laser beam to the magneto-optical recording medium and the laser beam reflected from the magneto-optical recording medium is detected. It is therefore necessary to rotate the plane of polarization at an extremely high accuracy to reproduce a signal using a laser beam having the plane of polarization rotated by liquid crystal. In practice, the angle of rotation differs for every liquid crystal even if the same type of liquid crystal is used. Therefore, there was a problem that the reproduction characteristic of the magneto-optical recording medium is degraded.

Japanese Patent Laying-Open No. 5-120720 discloses an optical head having the effective numerical aperture of the objective lens altered by partially blocking the laser beam using liquid crystal and an analyzer. However, this optical head has the outer portion of the laser beam blocked to realize compatibility with optical recording media that has various recording densities.

SUMMARY OF THE INVENTION

An object of the present invention is to provide a superresolution optical pickup apparatus of favorable reproducibility.

According to an aspect of the present invention, an optical pickup apparatus includes a laser, an objective lens, a polarization plane rotary unit, and a blocking element. The objective lens focuses the laser beam from the laser onto an optical recording medium. The polarization plane rotary unit is arranged between the laser and the objective lens to pass through the laser beam from the laser at the time of reproduction without rotating the plane of polarization of at least the portion other than the center portion. The blocking element is arranged between the polarization plane rotary unit and the objective lens to block the center portion of the laser beam from the polarization plane rotary unit and pass through other portions of the laser beam. Preferably, the polarization plane rotary unit passes through the laser beam without rotating the plane of polarization of the whole laser beam at the time of recording, and passes through the laser beam with the plane of polarization of the center portion of the laser beam rotated and the plane of polarization of the other portion of the laser beam not rotated at the time of reproduction.

The main advantage of the present invention lies in that the Kerr angle of rotation can be detected at high accuracy to improve the reproduction characteristic since the plane of polarization of the laser beam other than the center portion is not rotated at the time of reproduction.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described in detail hereinafter with reference to the drawings.

First Embodiment

Figure 1:
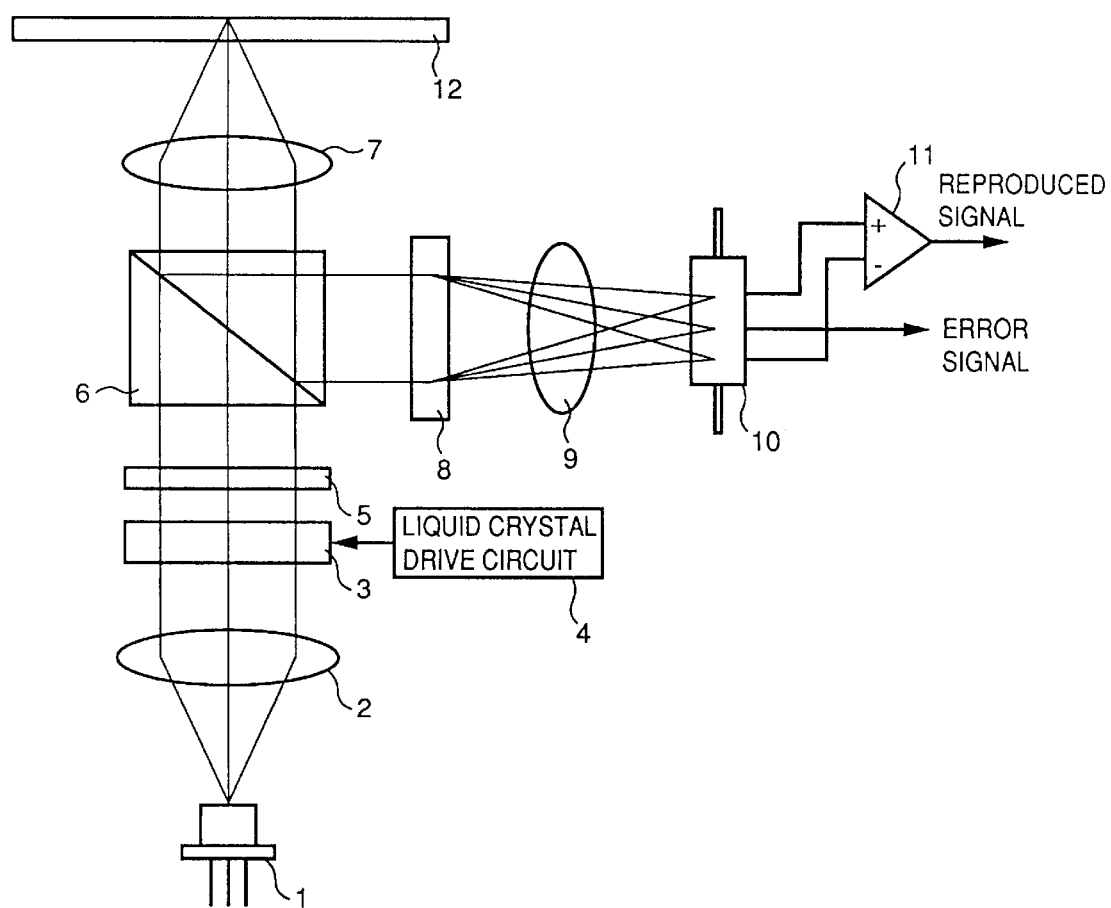
FIG. 1 shows a structure of an optical pickup apparatus according to a first embodiment of the present invention.

Referring to FIG. 1, an optical pickup apparatus according to a first embodiment of the present invention includes a semiconductor laser 1, a collimator lens 2, a polarization plane rotary unit 3, a liquid crystal drive circuit 4, a polarizing film 5, a half mirror 6, an objective lens 7, a Wollaston prism 8, a collective lens 9, a photodetector 10, and a differential amplifier 11.

Semiconductor laser 1 emits a laser beam having a wavelength of 680 (tolerable error ±15) nm. Collimator lens 2 renders the laser beam from semiconductor laser 1 parallel. Polarization plane rotary unit 3 is arranged between semiconductor laser 1 and objective lens 7 to pass through the laser beam entirely without rotating the plane of polarization at the time of recording, and passing through the laser beam with the plane of polarization of the center portion of the laser beam rotated and the plane of polarization of the other portion of the laser beam not rotated at the time of reproduction.

Liquid crystal drive circuit 4 drives the liquid crystal (described afterwards) in polarization plane rotary unit 3 so that polarization plane rotary unit 3 operates as described above. Polarizing film 5 is arranged between polarization plane rotary unit 3 and objective lens 7 to block the center portion of the laser beam from polarization plane rotary unit 3 and passing through other portions of the laser beam from polarization plane rotary unit 3. Polarizing film 5 is provided at a region where the entire laser beam is incident, and has a direction of polarization substantially identical to that of the laser beam entering polarization plane rotary unit 3. Half mirror 6 transmits the laser beam from polarizing film 5 straight forward towards objective lens 7, and reflects the laser beam from objective lens 7 perpendicularly towards Wollaston prism 8. Objective lens 7 is provided opposite to magneto-optical disk 12 to focus the laser beam from semiconductor laser 1 on magneto-optical disk 12, and renders the laser beam reflected from magneto-optical disk 12 parallel, which is returned to half mirror 6. Wollaston prism 8 divides the laser beam into a P polarization component and a S polarization component. Collective lens 9 focuses the laser beam from Wollaston prism 8 on photodetector 10. Photodetector 10 detects respective laser beams divided by Wollaston prism 8. Differential amplifier 11 generates a reproduced signal according to the P polarization component and S polarization component detected by photodetector 10. Photodetector 10 also generates an error signal such as a focus error signal, a tracking error signal, and the like.

Preferably, a polarizing beemspliter can be utilized in stead of half mirror 6.

The numerical aperture of objective lens 7 is 0.55 (tolerable error ±0.05). The thickness of the transparent substrate of magneto-optical disk 12 is 0.6 (tolerable error ±0.05) mm.

Figure 2:
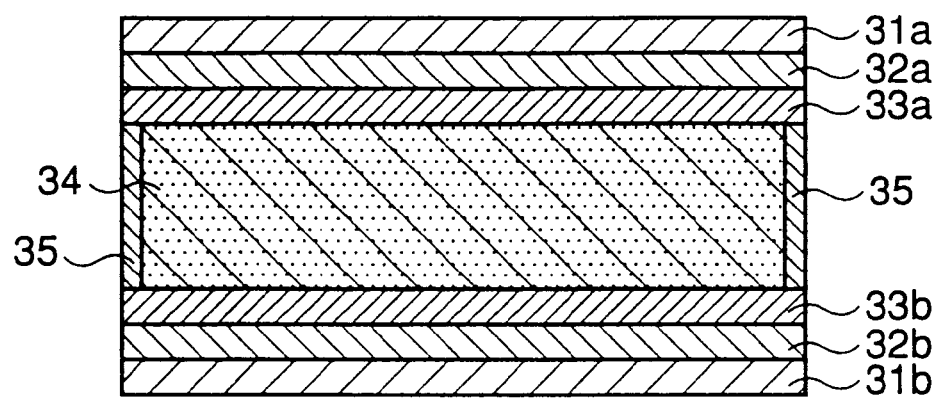
FIG. 2 is a sectional view of a polarization plane rotary unit of FIG. 1.

Referring to FIG. 2, polarization plane rotary unit 3 includes two glass plates 31a and 31b opposite to each other, transparent electrodes 32a and 32b such as ITO formed on respective inner planes of glass plates 31a and 31b, respectively, orientation films 33a and 33b formed on transparent electrodes 32a and 32b, respectively, a TN (Twisted Nematic) liquid crystal 34 sandwiched by glass plates 31a and 31b between orientation films 33a and 33b, and a sealant 35 formed around TN liquid crystal 34.

Orientation films 33a and 33b are formed so that the rubbing direction is orthogonal to each other. Accordingly, the continuous liquid crystal molecules between orientation films 33a and 33b are twisted 90° when no voltage is applied across transparent electrodes 32a and 32b.

Figure 3:
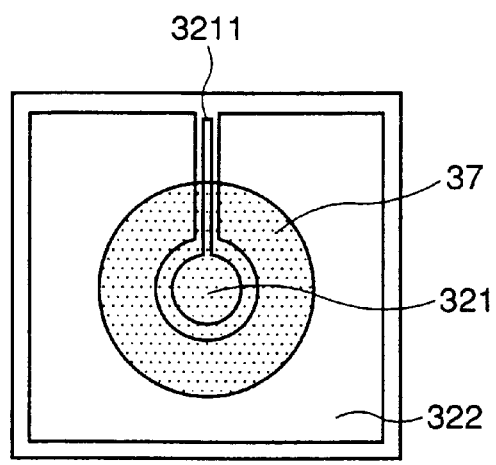
FIG. 3 is a plan view of the polarization plane rotary unit of FIG. 2.

As shown in FIG. 3, transparent electrodes 32a and 32b are not formed all over the surface, and divided into a circular center region 321 and a peripheral region 322. Center region 321 includes a leading line 3211 extending up to the circumference of polarization plane rotary unit 3. There is a gap in peripheral region 322 for leading line 3211. The center portion of a laser beam 37 is introduced into center region 321. The outer portion of laser beam 37 is introduced into peripheral region 322. Center region 321 is spaced apart from peripheral region 322 by approximately 1 $\mu$m. This gap is much smaller than the effective luminance flux diameter of 4 mm$\phi$ of laser beam 37 so that there is hardly no effect on laser beam 37. Transparent electrodes 32a and 32b including center region 321 and peripheral region 322 can easily be fabricated by forming a transparent electrode all over the surface and then cutting an appropriate region of the electrode by a laser beam.

Liquid crystal drive circuit 4 applies a voltage across both regions of 321 and 322 corresponding to glass plate 31a and both regions of 321 and 322 corresponding to glass plate 31b at the time of recording, and across peripheral region 322 corresponding to glass plate 31a and peripheral region 322 corresponding to glass plate 31b at the time of reproduction.

The operation of the optical pickup apparatus having the above structure will be described hereinafter.

Referring to FIG. 1 again, the laser beam emitted form semiconductor laser 1 is made parallel by collimator lens 2. The parallel laser beam passes through polarization plane rotary unit 3 and polarizing filter 5 in a manner differing between recording and reproduction. At the time of recording, the entire laser beam is transmitted. At the time of reproduction, only the outer portion of the laser beam is transmitted. The operation of polarization plane rotary unit 3 and polarizing film 5 will be described below.

The laser beam passing through polarization plane rotary unit 3 and polarizing film 5 further passes through half mirror 6 to be focused on magneto-optical disk 12 by objective lens 7. The laser beam reflected from magneto-optical disk 12 is made parallel by objective lens 7 and then reflected perpendicularly by half mirror 6. The laser beam reflected by half mirror 6 is divided into P and S polarization components by Wollaston prism 8 to be further focused on photodetector 10 by collective lens 9. Since the P polarization component and the S polarization component differ according to the Kerr angle of rotation between the plane of polarization of the incident laser beam to magneto-optical disk 12 and the plane of polarization of the laser beam reflected from magneto-optical disk 12, a reproduced signal is generated by differential amplifier 11 that receives the detected output of the P and S polarization components from photodetector 10.

Figure 4:
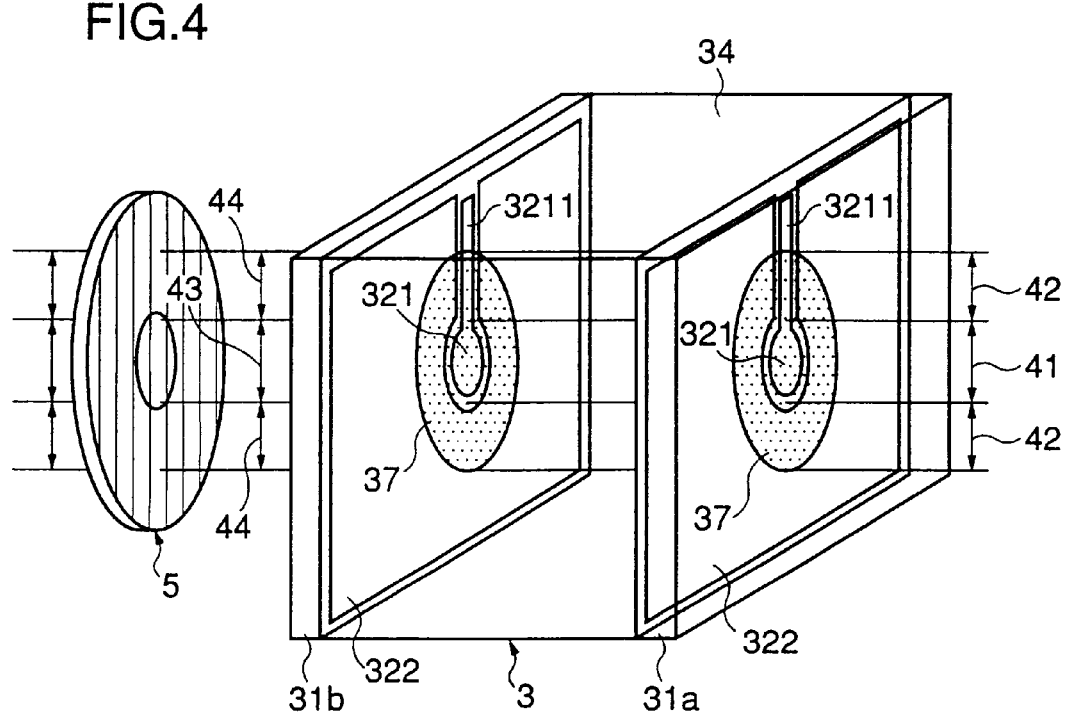
FIG. 4 is a perspective view of the polarization plane rotary unit shown in FIG. 1 and a polarizing film for describing an operation of reproduction.

As shown in FIG. 4, voltage is applied across regions 321 and 322 at the glass plate 31a side and regions 321 and 322 at the glass plate 31b side at the time of recording. Application of voltage to TN liquid crystal 34 causes loss of the optical rotating power. Therefore, the laser beam in polarization plane rotary unit 3 is directly passed through without having the plane of polarization rotated. Therefore, the polarization directions 43 and 44 of laser beam output from polarization plane rotary unit 3 is identical to the polarization directions 41 and 42 of the laser beam prior to entering polarization plane rotary unit 3.

Since the direction of polarization of polarizing film 5 is substantially identical to the polarization directions 41 and 42 of the laser beam before entering polarization plane rotary unit 3, all of the laser beam passing through polarization plane rotary unit 3 goes through polarizing film 5.

Figure 5:
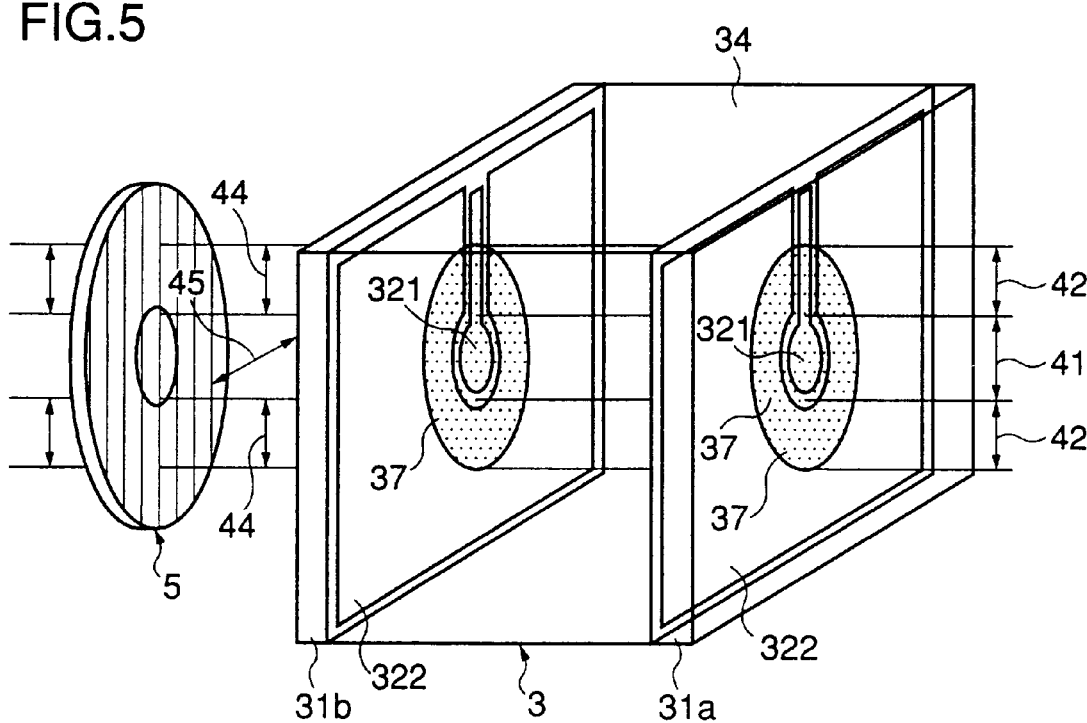
FIG. 5 is a perspective view of the polarization plane rotary unit shown in FIG. 1 and a polarizing film for describing an operation of reproduction.

Referring to FIG. 5 corresponding to a reproduction operation, voltage is applied across peripheral region 322 at the side of glass plate 31*a* and peripheral region 322 at the side of glass plate 31*b* by liquid crystal drive circuit 4 shown in FIG. 1. No voltage is applied across center region 321 of the glass plate 31*a* side and center region 321 of the glass plate 31*b* side. Therefore, the laser beam passes through polarization plane rotary unit 3 with only the plane of polarization of the center portion thereof rotated. More specifically, the polarization direction 45 of the center portion of the laser beam output from polarization plane rotary unit 3 is orthogonal to the polarization direction 41 of the center portion of the laser beam before entering polarization plane rotary unit 3. Polarization direction 44 of the outer portion of the laser beam output from polarization plane rotary unit 3 is identical to polarization direction 42 of the outer portion of the laser beam before entering polarization plane rotary unit 3.

The laser beam passing through polarization plane rotary unit 3 is introduced into polarizing filter 5. The center portion of the laser beam is blocked by polarizing filter 5 and only the outer portion of the laser beam passes through polarizing film 5 since the direction of polarization of polarizing film 5 is identical to polarization directions 41 and 42 of the laser beam prior to entering polarization plane rotary unit 3.

Figure 6:
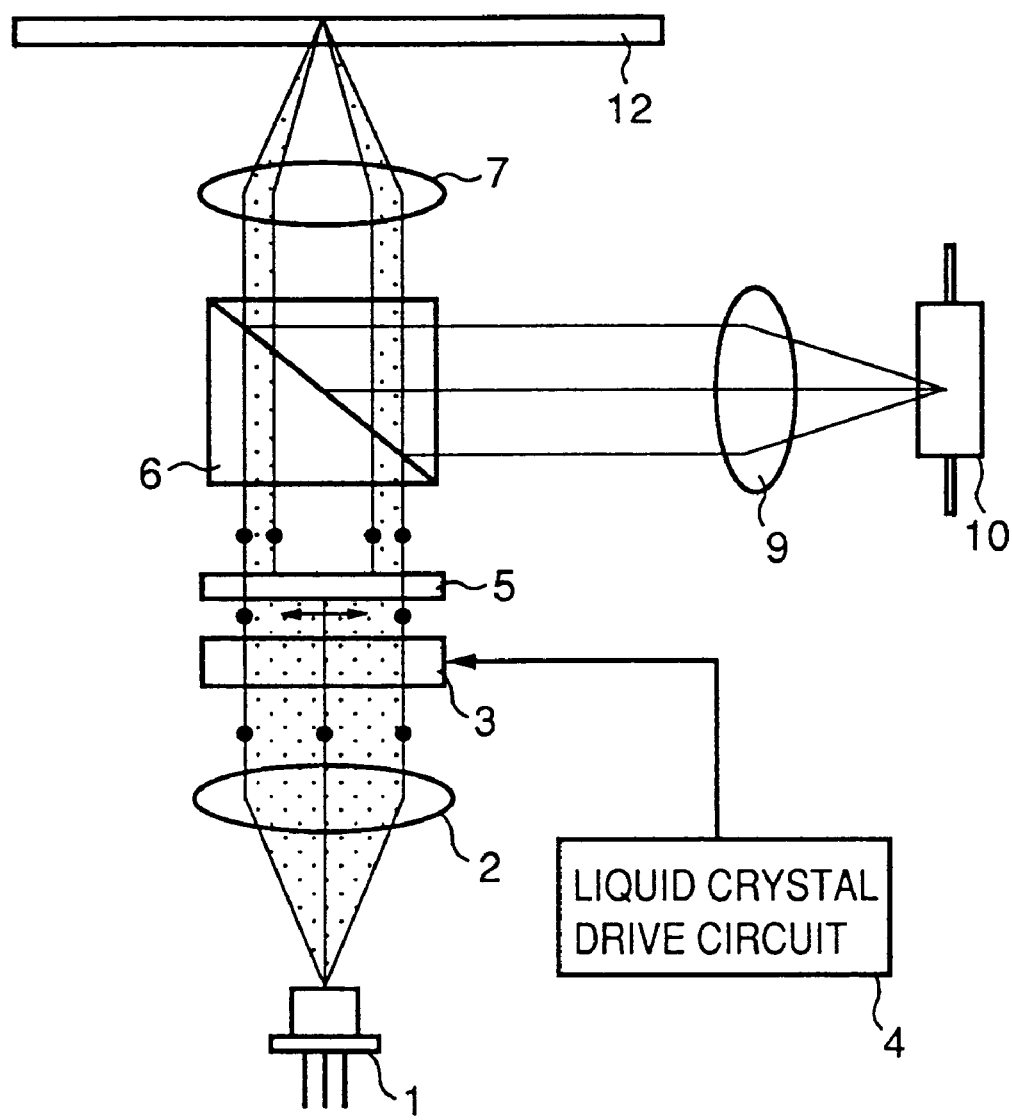
FIG. 6 is a diagram for describing an operation of reproduction of the optical pickup apparatus of FIG. 1.
Figure 7:
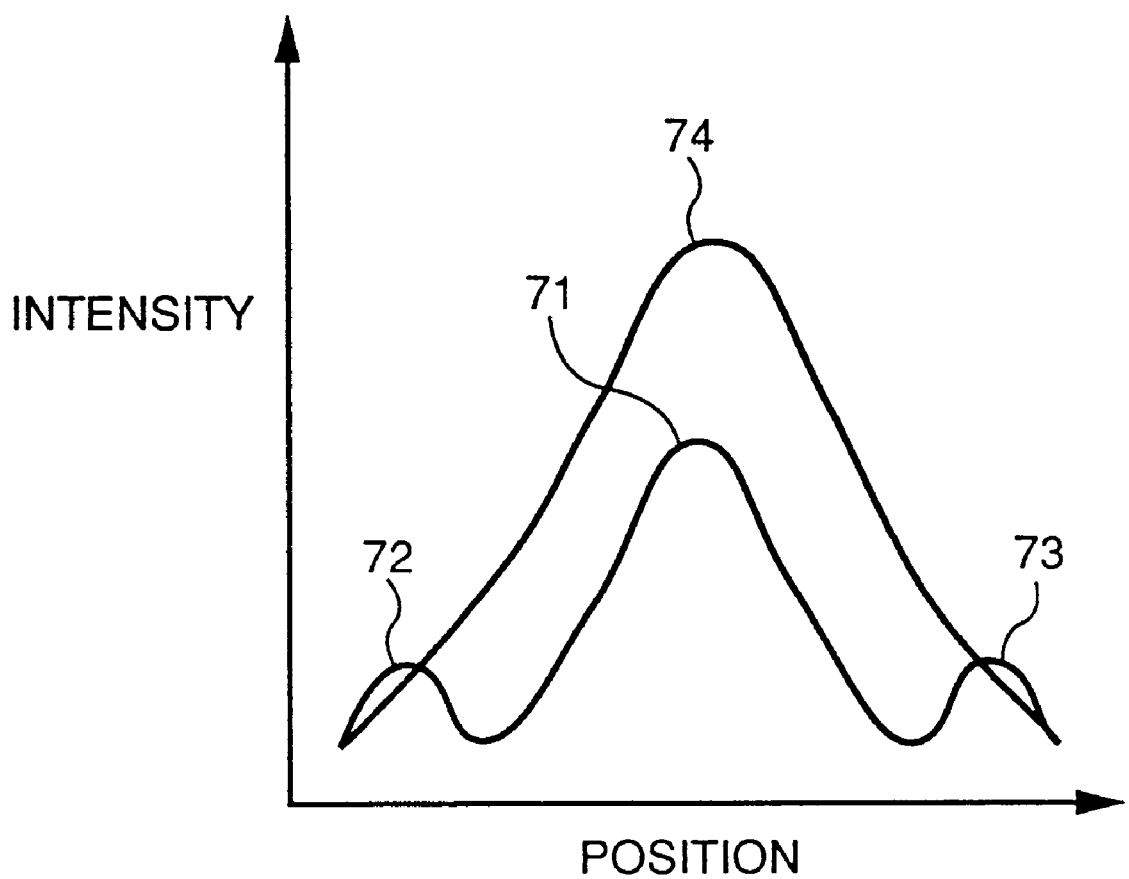
FIG. 7 shows the intensity distribution of a beam spot formed on a magneto-optical disk by the optical pickup apparatus shown in FIG. 1.

As shown in FIG. 6, the outer portion of the laser beam passing through polarizing film 5 is transmitted through half mirror 6 to be focused on magneto-optical disk 12 by objective lens 7. Since only the outer portion of the laser beam is focused, the distribution of the intensity of the beam spot formed on magneto-optical disk 12 is as shown in FIG. 7 due to mutual interference. More specifically, a main beam 71 of high intensity is formed at the center, and side beams 72 and 73 of weak intensity are formed at either side of main beam 71. The signal recorded on magneto-optical disk 12 is reproduced by main beam 71. Main beam 71 has a spot diameter of approximately 0.9 (tolerable error ±0.1)$\mu$m. This is smaller than the spot diameter of 1.2 $\mu$m of the laser beam 74 formed when the entire laser beam is passed through without the center portion blocked. Since a laser beam 71 of a smaller spot can be directed on magneto-optical disk 12 by blocking only the center portion of the laser beam, a signal recorded at high density can be reproduced. The laser beam used for reproducing a signal is directed to magneto-optical disk 12 without having the direction of polarization rotated. Therefore, the Kerr angle of rotation between the direction of polarization of the incident laser beam to magneto-optical disk 12 and the direction of polarization of the laser beam reflected from magneto-optical disk 12 can be detected at high accuracy. As a result, the reproducibility is improved.

In the first embodiment, leading lines 3211 and 3211 are arranged facing each other. However, the leading lines do not always have to face each other. For example, one leading line 3211 may extend towards the opposite perimeter of the other glass plate 31*a* or 31*b*.

Second Embodiment

Figure 8:
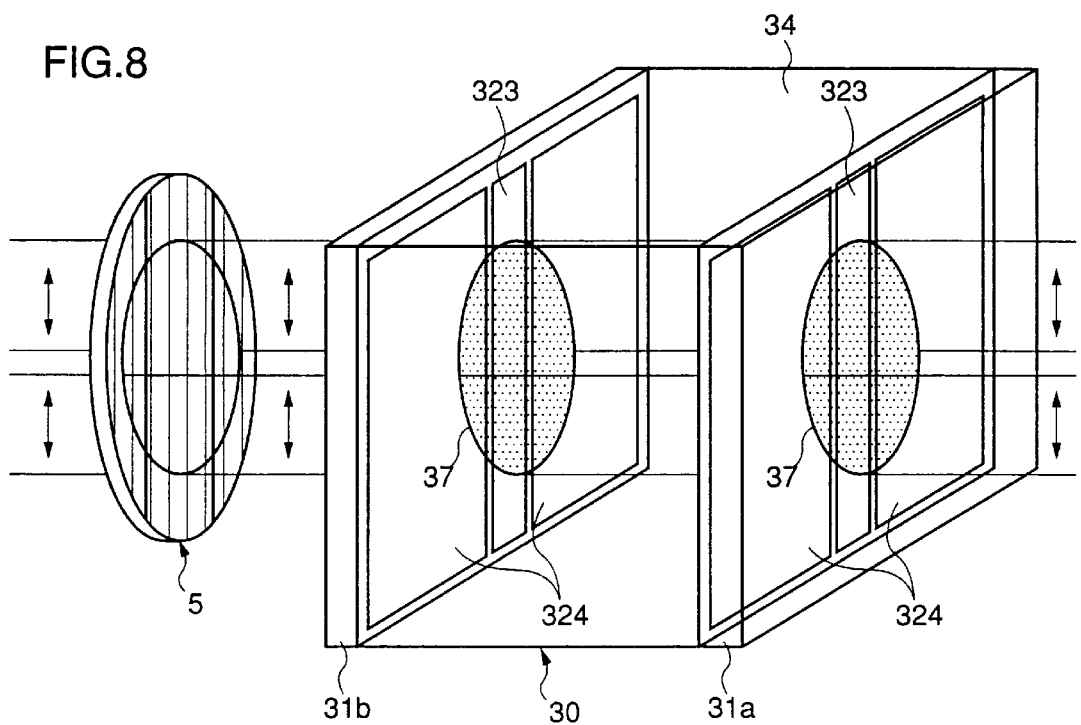
FIG. 8 is a perspective view of a polarization plane rotary unit and a polarizing film of an optical pickup apparatus according to a second embodiment of the present invention for describing an operation of recording.
Figure 9:
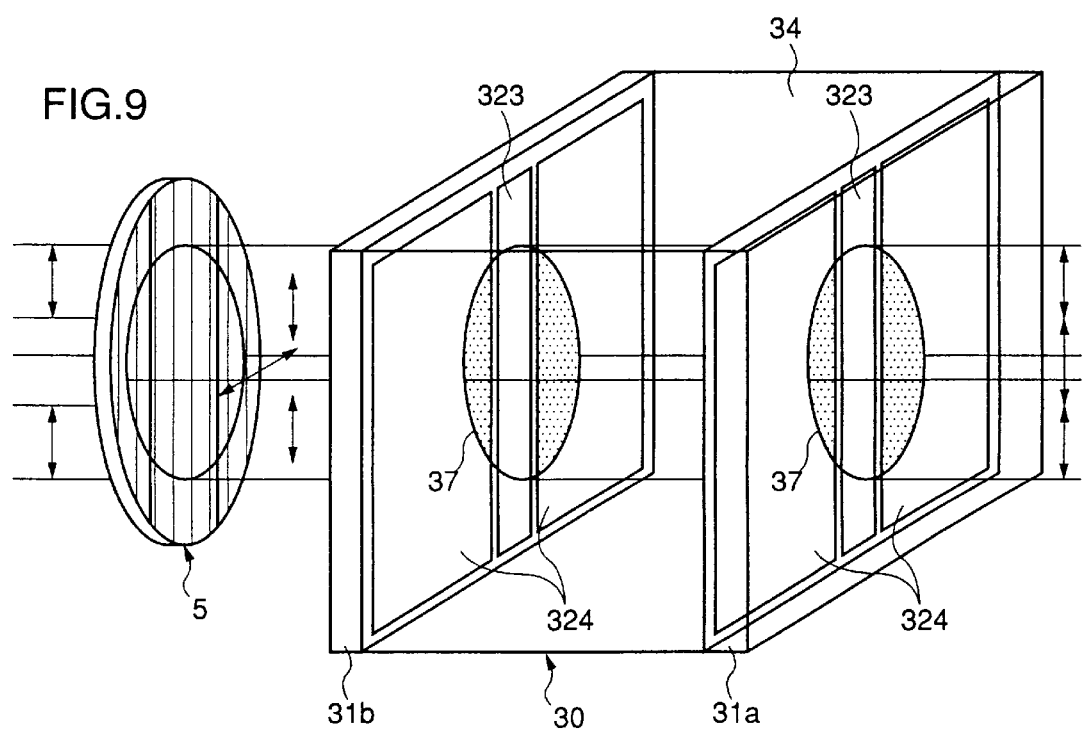
FIG. 9 is a perspective view of the polarization plane rotary unit and the polarizing film of the optical pickup apparatus of the second embodiment of the present invention for describing an operation of reproduction.

According to a second embodiment of the present invention, the center region 323 of the transparent electrode is rectangular, not circular, as shown in FIGS. 8 and 9. Also, a rectangular peripheral region 324 is formed at either side of rectangular center region 323.

Referring to FIG. 8 corresponding to a recording operation, voltage is applied across both regions 323 and 324 at the side of glass plate 31*a* and both regions 323 and 324 at the side of glass plate 31*b*. Likewise the operation described with reference to FIG. 4, the laser beam passes through polarization plane rotary unit 30 without having the plane of polarization rotated, and then passes through polarizing film 5.

Referring to FIG. 9 corresponding to a reproduction operation, voltage is applied only across peripheral region 324 at the side of glass plates 31*a* and peripheral region 324 at the side of glass plate 31*b*. No voltage is applied across center region 323 at the side of glass plate 31*a* and center region 323 at the side of glass plate 31*b*. Therefore, the laser beam passes through polarization plane rotary unit 30 having the plane of polarization of the center portion rotated and the plane of polarization of the remaining side regions not rotated. More specifically, only the direction of polarization of the laser beam passing through center region 323 of polarization plane rotary unit 30 is perpendicular to the direction of polarization of the laser beam prior to entering polarization plane rotary unit 30.

Since the direction of polarization of polarizing film 5 is identical to that of the incident laser beam into polarization plane rotary unit 30, the center portion of the laser beam passing through polarization plane rotary unit 30 is blocked, and both side portions of the laser beam pass through polarizing film 5.

By mutual interference, a main beam and side beams at both sides are formed on magneto-optical disk 12 since such two divided laser beams are focused by objective lens 7.

As in the present second embodiment, center region 323 of the transparent electrode is not limited to a circular shape, and may be a rectangle.

In the first and second embodiments, the transparent electrodes at both sides are patterned. However, only one of the transparent electrodes may be patterned. In this case, potential is applied to the transparent electrode that is not patterned in both the recording and reproducing operations. However, no electric field is generated at the center region of TN liquid crystal 34 since potential is not applied to the center region of the opposite transparent electrode.

Third Embodiment

Figure 10:
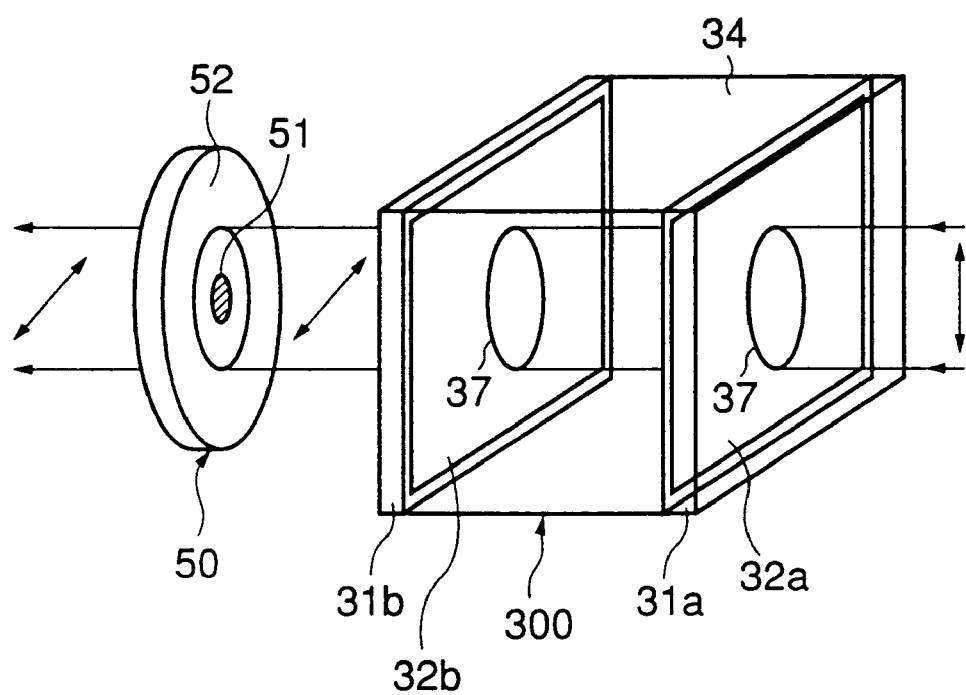
FIG. 10 is a perspective view of a polarization plane rotary unit and a polarizing film of an optical pickup apparatus according to a third embodiment of the present invention for describing an operation of recording.
Figure 11:
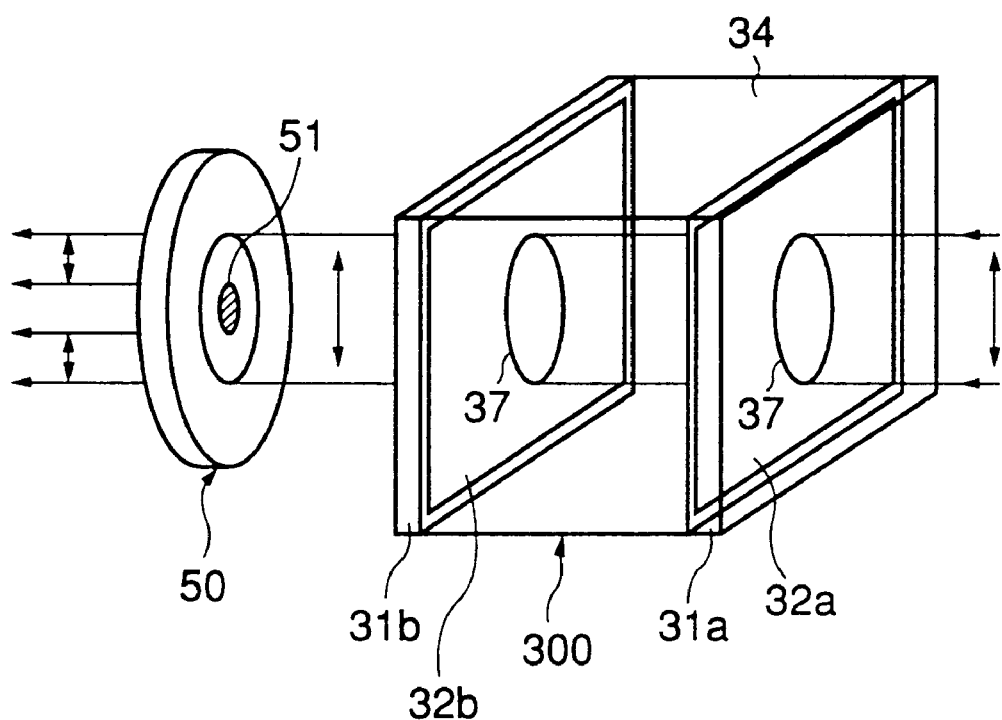
FIG. 11 is a perspective view of the polarization plane rotary unit and the polarizing film of the optical pickup apparatus according to the third embodiment of the present invention for describing an operation of reproduction.

According to the third embodiment of the present invention, transparent electrodes 32*a* and 32*b* are formed all over the surface without being patterned, as shown in FIGS. 10 and 11. Also, polarizing film 50 has the polarization property only at a region 51 where the center region of the laser beam is introduced. The remaining area of polarizing film 50, i.e., outer region 52, is transparent. The polarization property of center region 51 is perpendicular to the direction of polarization of the laser beam prior to entering polarization plane rotary unit 300.

Referring to FIG. 10 corresponding to a recording operation, laser beam has its plane of polarization rotated perpendicularly to pass through polarization plane rotary unit 300 since no voltage is applied across transparent electrodes 32*a* and 32*b*. The direction of polarization of center region 51 of polarizing film 50 is perpendicular to the direction of polarization of the laser beam entering polarization plane rotary unit 300. Therefore, the laser beam from polarization plane rotary unit 300 entirely passes through polarizing film 50.

Referring to FIG. 11 corresponding to a reproducing operation, laser beam passes through polarization plane rotary unit 300 without having its plane of polarization rotated since a voltage is applied across transparent electrodes 32a and 32b. Since the direction of polarization of center region 51 of polarizing film 50 is perpendicular to the direction of polarization of the laser beam entering polarization plane rotary unit 300, the laser beam from polarization plane rotary unit 300 has its center portion blocked by center region 51 of polarizing film 51, and the remaining outer portion of the laser beam passes through polarizing film 50.

Similar to the third embodiment, the direction of polarization of the laser beam directed onto magneto-optical disk 12 at the time of reproduction is not rotated. Therefore, the Kerr angle of rotation can be detected at high accuracy to improve the reproduction characteristic. Thus, the polarization plane rotary unit passes through the laser beam at the time of reproduction with the plane of polarization of at least the portion other than the center portion of the laser beam not rotated.

Region 51 having polarization property in the third embodiment is not restricted to a circular shape, and may be rectangular traversing the incident laser beam.

Furthermore, a STN (Super Twisted Nematic) type liquid crystal may be used instead of the TN type liquid crystal used in the above embodiments. Also, a polarizing glass can be used instead of the polarizing film employed as a polarizing plate for blocking the center portion of a laser beam. The present invention is not limited to an optical pickup apparatus for a magneto-optical disk. The present invention is also applicable to an optical pickup apparatus of a phase change disk.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical pickup apparatus, comprising:

a laser;

an objective lens focusing a laser beam from said laser onto an optical recording medium;

a polarization plane rotary unit arranged between said laser and said objective lens for passing through the laser beam from said laser without rotating the plane of polarization of at least a portion other than a center portion of the laser beam at the time of reproduction; and a blocking element arranged between said polarization plane rotary unit and said objective lens for blocking the center portion of the laser beam from said polarization plane rotary unit and passing through the remaining portion of the laser beam, wherein said polarization plane rotary unit passes through said laser beam without rotating the plane of polarization of the entire laser beam at the time of recording, and passes through said laser beam with the plane of polarization of the center portion of said laser beam rotated and without rotating the plane of polarization of the remaining portion of the laser beam at the time of reproduction.

2. The optical pickup apparatus according to claim 1, wherein said polarization plane rotary unit comprises liquid crystal, a first transparent plate provided at one side face of said liquid crystal, a second transparent plate provided at another side face opposite to said one side face of said liquid crystal, a first transparent electrode formed on an inner face of said first transparent plate, said first transparent electrode including a first region into which the center portion of said laser beam is introduced, and a second region into which a portion of said laser beam other than the center portion is introduced, a second transparent electrode formed on an inner face of said second transparent plate, and a voltage applying circuit for applying a voltage across said first and second regions of said first transparent electrode and said second transparent electrode at the time of recording, and applying a voltage across said second region of said first transparent electrode and said second transparent electrode at the time of reproduction.

3. The optical pickup apparatus according to claim 2, wherein said second transparent electrode includes a third region into which the center portion of said laser beam is introduced, and a fourth region into which a portion of said laser beam other than the center portion is introduced, wherein said voltage apply circuit applies a voltage across said first and second regions and said third and fourth regions at the time of recording, and a voltage across said second region and said fourth region at the time of reproduction.

4. The optical pickup apparatus according to claim 2, wherein said first region is circular.

5. The optical pickup apparatus according to claim 2, wherein said first region is rectangular.

6. The optical pickup apparatus according to claim 2, wherein said liquid crystal is twisted nematic liquid crystal.

7. The optical pickup apparatus according to claim 2, wherein said liquid crystal is super twisted nematic liquid crystal.

8. The optical pickup apparatus according to claim 1, wherein said blocking element comprises a polarizing plate provided at a region where said laser beam is entirely incident, and having a direction of polarization substantially identical to the direction of polarization of incident laser beam into said polarization plane rotary unit.

9. The optical pickup apparatus according to claim 8, wherein said polarizing plate is a polarizing film.

10. The optical pickup apparatus according to claim 8, wherein said polarizing plate is a polarizing glass.

* * * * *